US012065874B1

(12) United States Patent
Earnest

(10) Patent No.: US 12,065,874 B1
(45) Date of Patent: Aug. 20, 2024

(54) OVERHEAD GARAGE DOOR TRIM SEAL APPARATUS AND METHOD OF INSTALLATION AND USE

(71) Applicant: GRIDZ LLC, Knoxville, TN (US)

(72) Inventor: William Keith Earnest, Louisville, TN (US)

(73) Assignee: GRIDZ LLC, Knoxville, TN (US)

( * ) Notice: Subject to any disclaimer, the term of this patent is extended or adjusted under 35 U.S.C. 154(b) by 0 days.

(21) Appl. No.: 18/222,810

(22) Filed: Jul. 17, 2023

(51) Int. Cl.
*E06B 7/23* (2006.01)

(52) U.S. Cl.
CPC .................................. *E06B 7/2305* (2013.01)

(58) Field of Classification Search
CPC ........ E06B 7/235; E06B 7/2307; E06B 9/582; E06B 7/2305
USPC ......................................................... 49/475.1
See application file for complete search history.

(56) References Cited

U.S. PATENT DOCUMENTS 5,435,104 A * 7/1995 Dietrich ................... B60J 10/84 49/475.1
5,784,834 A * 7/1998 Stutzman .............. E06B 7/2307 49/197
6,167,657 B1 * 1/2001 Burge ..................... B29C 48/12 156/244.11
6,360,489 B1 * 3/2002 Burge ..................... B29C 48/08 156/244.26
6,374,567 B1 * 4/2002 Mullet .................... E06B 9/582 52/717.03
6,772,560 B2 * 8/2004 Dischiant .................. E06B 7/23 49/197
6,772,561 B1 * 8/2004 Berger, Jr. .............. E06B 7/232 160/40
8,881,464 B1 * 11/2014 Huckeba ............... E06B 1/6046 49/489.1
8,910,421 B2 12/2014 Potter
9,045,937 B2 * 6/2015 Peck .......................... E06B 7/16
9,068,391 B2 6/2015 Peck et al.
9,745,798 B2 * 8/2017 Preising, Jr. .......... E06B 7/2314
9,845,628 B2 12/2017 Cunningham
9,845,638 B1 * 12/2017 Cunningham .......... E06B 7/231
11,180,949 B2 * 11/2021 Patock .................. E06B 7/2314
(Continued)

FOREIGN PATENT DOCUMENTS

EP 2369116 A2 * 9/2011 ............... E06B 3/62
GB 2269416 A * 2/1994 ............. E06B 5/164

OTHER PUBLICATIONS

Machine translation of EP2369116A2.*

*Primary Examiner* — Marcus Menezes
(74) *Attorney, Agent, or Firm* — Master Key IP, LLP; Jeromye V. Sartain

(57) ABSTRACT

A trim seal apparatus has a lengthwise body having a face surface and an opposite ribbed surface each spanning between a front surface and an opposite rear surface of the body and a lengthwise front flap extending at an angle in the direction of the ribbed surface from a location along the front surface that is at least midway between the face surface and the ribbed surface or that is closer to the ribbed surface than the face surface, in use when the body is installed on the door frame with the ribbed surface directly against the door frame the front flap is oriented toward and configured to make sealing contact against the door frame so as to seal the garage door opening between the body and the door frame.

19 Claims, 10 Drawing Sheets

(56) References Cited

U.S. PATENT DOCUMENTS

2013/0067820 A1 * 3/2013 Jett ........................ E06B 7/2305
49/490.1

* cited by examiner

OVERHEAD GARAGE DOOR TRIM SEAL APPARATUS AND METHOD OF INSTALLATION AND USE

BACKGROUND

The subject of this patent application relates generally to door seals, and more particularly to overhead garage door trim seal configured for sealing between the door frame and the front of the overhead garage door.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, overhead garage doors are widely known and used as having parallel horizontal sections that are interconnected by hinges and each have opposite rollers that operate in corresponding tracks mounted at the left and right sides of the garage structure adjacent the opening, each such track having a vertical portion that is substantially parallel to the front of the garage or building and a horizontal portion that is parallel to the floor and/or roof or ceiling of the garage or building with a curved portion of track therebetween, whereby the garage door can be operated whether manually or via a garage door motor assembly so as to shift between a substantially vertical closed position and a substantially horizontal open position. The typical sizes of such garage openings and thus such overhead garage doors are either eight feet (8 ft.) (single-car) or sixteen feet (16 ft.) (two-car) in width and approximately seven feet (7 ft.) in height made up of either three horizontal hinged door sections of approximately twenty-eight inches (28 in.) in height each or four horizontal hinged door sections of approximately twenty-one inches (21 in.) in height each. The related opening in which the garage door is installed is sized accordingly, the door frame generally comprising opposite vertical jambs and a horizontal header along with any related framing substructure or casing.

In the typical garage door installation, the overall perimeter of the door is roughly the same size as the overall structural opening the door is installed in or adjacent to and selectively opens and closes. And based on the configuration of the track and roller system, the door is typically spaced inwardly from the opening, or from the jambs and header of the door frame, to ensure unrestricted movement of the door, such that there is a slight gap between the overhead garage door perimeter and the door frame opening. Such gaps around the door if unsealed allow for the passage of air, water, light, and debris from outside the structure into the garage and thus thermal inefficiencies as well as noxious odors and noise both from the outside and from the door itself such as due to wind-induced whistling and rattling.

To address the problem of the gap between the overhead garage door perimeter and the door frame opening, various solutions have been proposed over the years essentially relating to a trim seal or weather seal or weatherstripping material that may be installed along the door frame, or jambs and header, positioned so as to contact and seal against the outer surface or face of the garage door when in the closed position within or adjacent to the opening. Such trim pieces typically involve an elongate somewhat rectangular cross-section or profile body having an elongate flexible flap extending at an angle along one edge or surface of the trim piece body, such as shown in U.S. Pat. Nos. 6,167,657 and 6,360,489 to Burge et al. When the trim piece body is affixed to the door frame as by being cut into pieces of the appropriate length and nailed or screwed to the jambs and header, the flexible flap is oriented inwardly so as to make contact with the face of the garage door perimeter when the door is closed. While such conventional door trim seal generally resists air flow around the door and thus prevents some of the adverse effects of air, water, light, and dirt and debris passing around the door and into the garage, it also has drawbacks in performance primarily related to its tendency to bow or separate from the door frame due to improper installation or weather and thermal effects over time. If this is not addressed as is often the case, then the door trim seal is only performing marginally, as the interior of the garage is yet able to be compromised by air, water, light, and debris from outside the structure that can still pass into the garage behind the trim seal, or again between the trim seal and the door frame, with attendant thermal inefficiencies remaining. Alternatively, an additional installation step of caulking the front edge of the door trim seal has been employed in an effort to seal any gap that may exist or form between the inside surface of the trim piece and the door frame or jamb or header, but the additional caulking step comes at additional labor and material cost and also makes removal and replacement of the door trim pieces more difficult, disadvantageously often requiring resurfacing and repainting of the surrounding door frame as well.

In an effort to improve on the basic door trim seal as described above, other solutions have been proposed more recently. Most such alternative door trim seal systems are relatively complex multi-part systems such as involving both an interior door jamb trim and an exterior door jamb trim that together form an adjustable mating configuration that seals the interface between the two trims to account for various door frame widths or gap widths between the door and frame as shown in U.S. Pat. No. 9,068,391 to Peck et al. or as having a base trim piece through which fasteners are installed into the door frame and a trim piece cap that then goes over the trim piece base to conceal the fastener heads, such as shown in U.S. Pat. No. 6,772,560 to Dischiant et al., U.S. Pat. No. 9,045,937 to Peck et al., and U.S. Pat. No. 9,845,638 to Cunningham, which by having effectively double the amount of trim piece material for the perimeter of the door and door frame than would otherwise be required essentially results in about double the cost, which along with additional installation steps being required renders such alternative door trim seal systems also disadvantageous.

Of the above-noted alternative door trim seal systems, only the Cunningham system of U.S. Pat. No. 9,845,638 also addressed the issue of sealing the front edge of the trim strip, or the edge opposite the garage door, so as to prevent or mitigate against a gap being formed between the inside surface of the trim strip and the door frame, or jamb or header, and the garage interior thus being breached, but such jamb seal edge is formed on the outer Cunningham trim strip that then must be snapped into a trim strip base installed along the door jamb, thus again effectively doubling the cost of the Cunningham system. Moreover, by design, the jamb seal edge extends from the outer surface of the outer snap-in trim strip just as the opposite door seal edge, resulting in further material cost by having a relatively greater width of the front jamb seal edge. Accordingly, the Cunningham system has several drawbacks in configuration and cost and so is a less than ideal solution.

Finally, there has also been proposed in U.S. Pat. No. 9,745,798 to Preising, Jr. et al., assigned to Overhead Door Corporation, an overhead door trim seal system entitled "Movable Barrier Seal Assembly" that involves an elongate base member having first and second sealing members extending from the base member for sealing engagement with the door. The first sealing member is the flexible flap type as is known so as to extend from the rear of the trim piece at an angle toward and able to contact and seal against a closed door, while the second sealing member is a deformable bulb-profile material also positioned at the rear edge of the trim piece adjacent to the first sealing member and so oriented toward and able to also contact and seal against the closed door, thereby effectively doubling the seal between the trim piece and the door, with the bulb-like second sealing member bowing outwardly when compressed by the door so as to contact the door frame and thus simultaneously provide resistance to movement of the door relative to door frame and some degree of seal laterally against the door frame at the back of the trim piece. However, this design also has a number of disadvantages in terms of cost and complexity as a multi-part configuration but also in terms of not sealing effectively against the door frame and not at all at the front or outer edge of the trim strip, which can thus still allow air and water to get behind the trim piece, or between the trim piece and the door frame, and so lead to issues whether or not also bypassing the bulb-like second seal member and into the garage.

What has been needed and heretofore unavailable is a cost-effective, easy-to-use, single-piece overhead garage door trim seal that effectively seals against both the garage door when closed and the door frame on which the trim seal is installed. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a new and novel trim seal apparatus. In at least one embodiment, a trim seal apparatus according to aspects of the present invention for selectively sealing a garage door opening comprises a lengthwise body having a face surface and an opposite ribbed surface each spanning between a front surface and an opposite rear surface of the body, the body configured for being installed directly onto a door frame defining the garage door opening such that the ribbed surface is to be directly against the door frame, and a lengthwise front flap extending at an angle in the direction of the ribbed surface from a location along the front surface that is at least midway between the face surface and the ribbed surface or that is closer to the ribbed surface than the face surface, in use when the body is installed on the door frame with the ribbed surface directly against the door frame the front flap is oriented toward and configured to make sealing contact against the door frame so as to seal the garage door opening between the body and the door frame.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
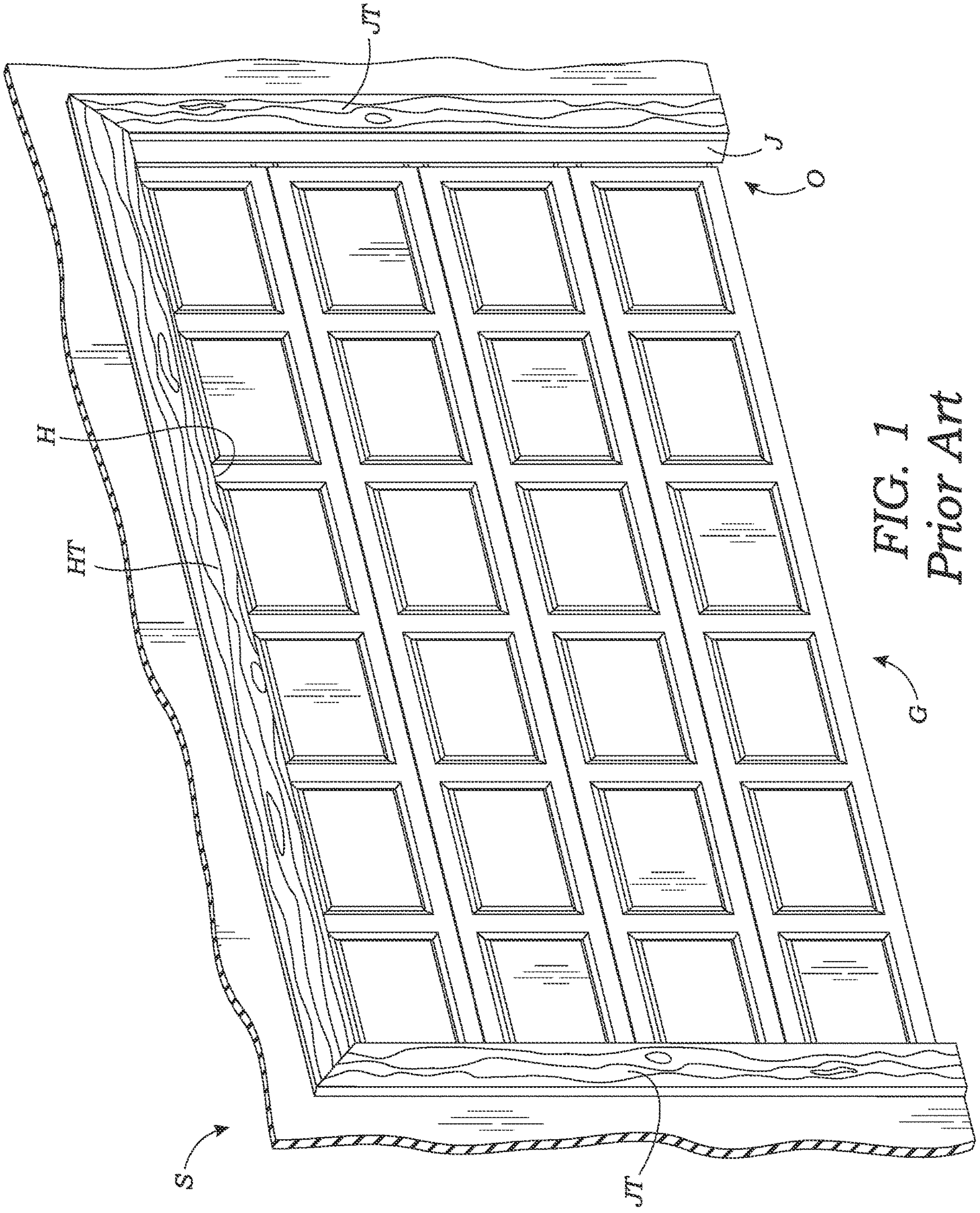
FIG. 1 Prior Art
FIG. 1 is a perspective view of an exemplary prior art overhead garage door as installed and in a closed position within a garage door opening within a structure.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

Figure 2:
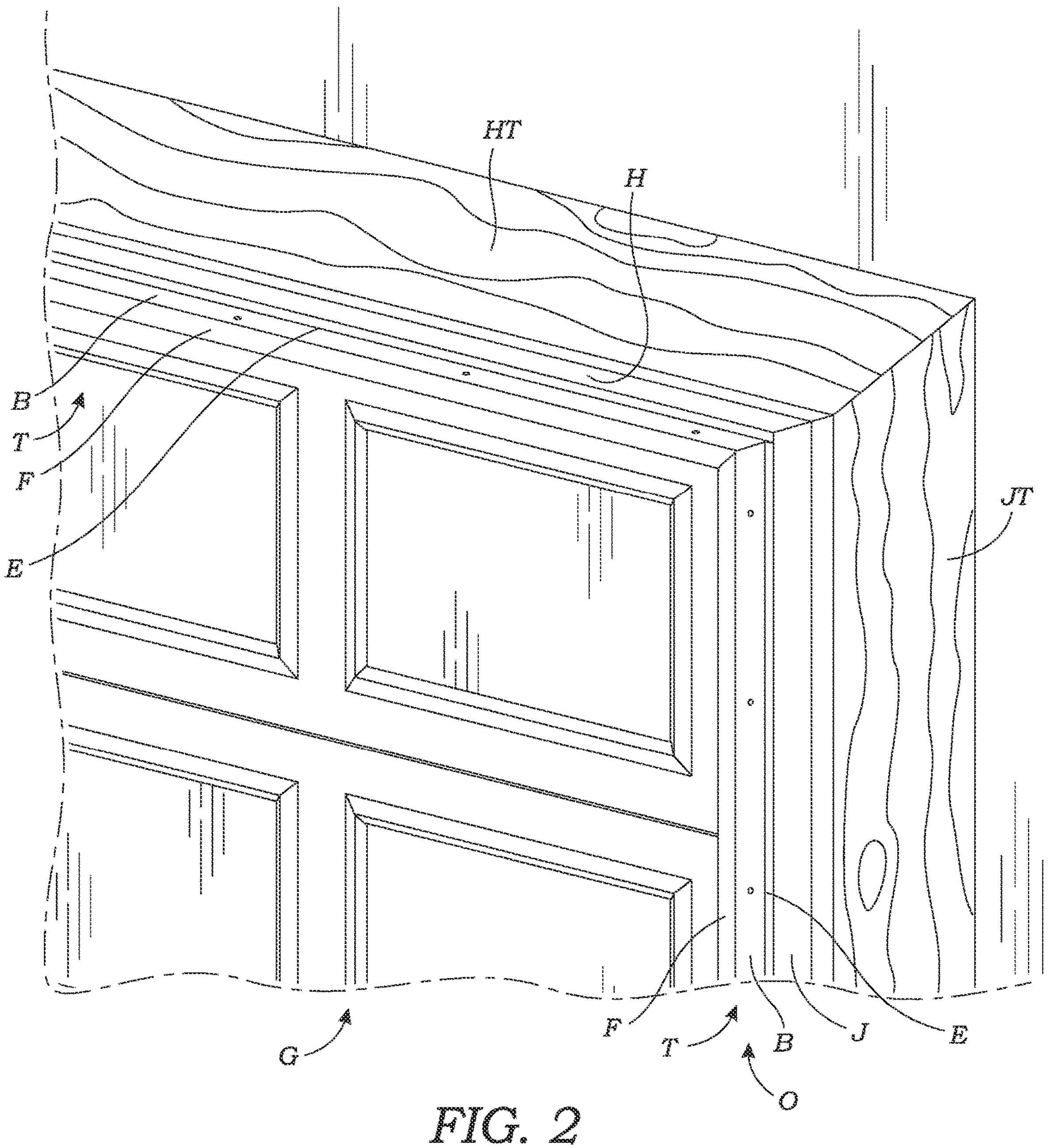
FIG. 2 Prior Art
FIG. 2 is an enlarged partial perspective view thereof showing one corner of the overhead garage door and surrounding structure including door frame header and jamb and prior art trim seal.

Referring first to FIGS. 1 and 2, there are shown perspective views of an exemplary prior art overhead garage door G as operably installed within an opening O in a structure S such as a building or free-standing garage. The opening O is effectively defined by a door frame generally comprising opposite vertical jambs J and a horizontal header H along with any related framing substructure or casing (not shown) and any perimeter facing or header trim HT and jamb trim JT. As shown in FIG. 2, to address the problem of the gap between the overhead garage door G at its perimeter and the door frame opening O, a trim seal T or weather seal or weatherstripping material is installed along the door frame, or jambs J and header H, positioned so as to contact and seal against the outer surface or face of the garage door G when in the closed position as within or adjacent to the opening O as shown. Such trim pieces T typically involve an elongate somewhat rectangular cross-section or profile body B having an elongate flexible flap F extending at an angle along one edge or surface of the trim piece body B, or specifically the surface oriented toward the garage door G when the trim seal T is installed on the door frame as shown. During installation, the trim piece body B is affixed to the door frame as by being cut into pieces of the appropriate length and nailed or screwed to the jambs J and header H, again, such that the flexible flap F is oriented inwardly so as to make contact with the face of the garage door G at its perimeter when closed, with the opposite front surface E of the trim seal body B being oriented outwardly or away from the garage door G. It is again that exposed surface E that can lead to a compromised trim seal T or a gap between the trim seal body B and the door frame due to buckling or bowing either during installation, such as by not cutting the trim seal body B to the proper length or using enough fasteners, or having the fasteners sufficiently close together, or over time due to weather and thermal effects.

Figure 3:
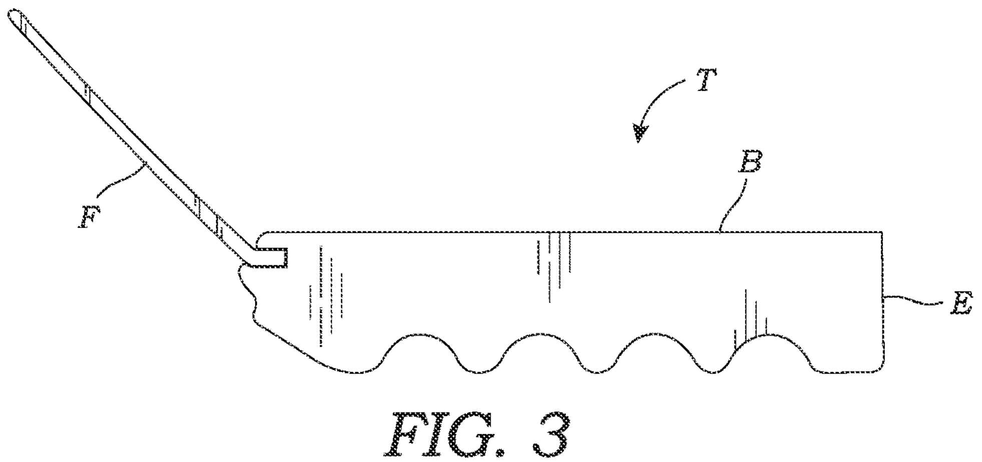
FIG. 3 Prior Art
FIG. 3 is an enlarged end view of a first exemplary prior art trim seal.
Figure 4:
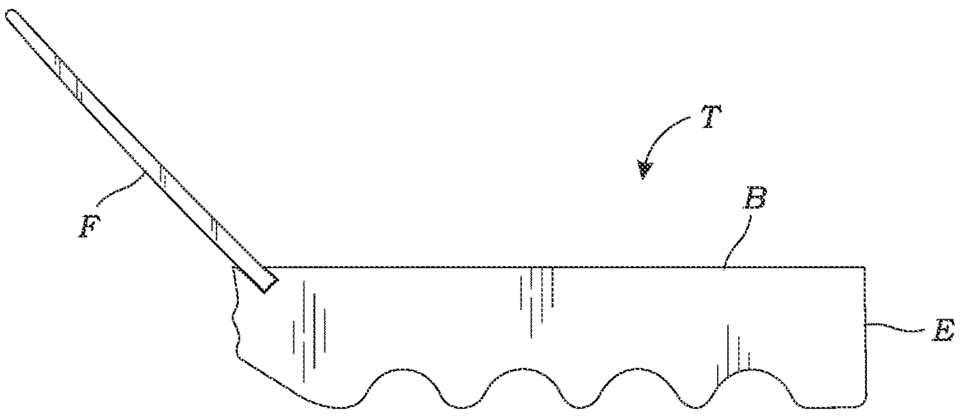
FIG. 4 Prior Art
FIG. 4 is an enlarged end view of a second exemplary prior art trim seal.
Figure 5:
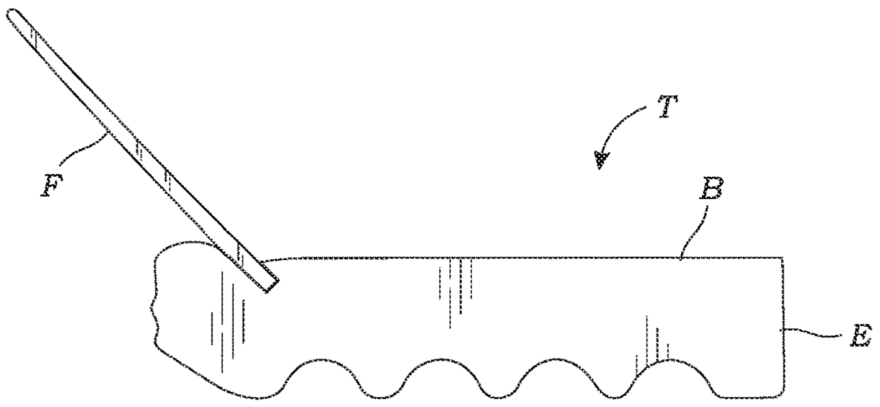
FIG. 5 Prior Art
FIG. 5 is an enlarged end view of a third exemplary prior art trim seal.
Figure 6:
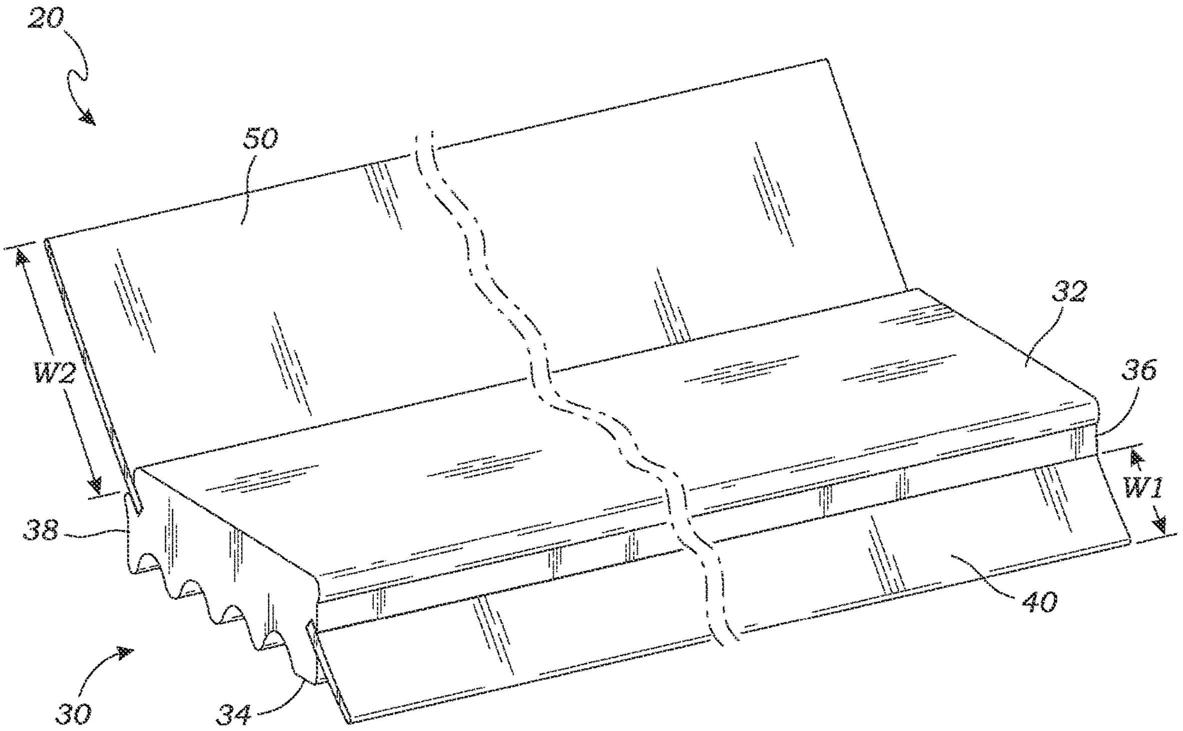
FIG. 6 is a perspective view of a first exemplary overhead garage door trim seal apparatus, in accordance with at least one embodiment.
Figure 7:
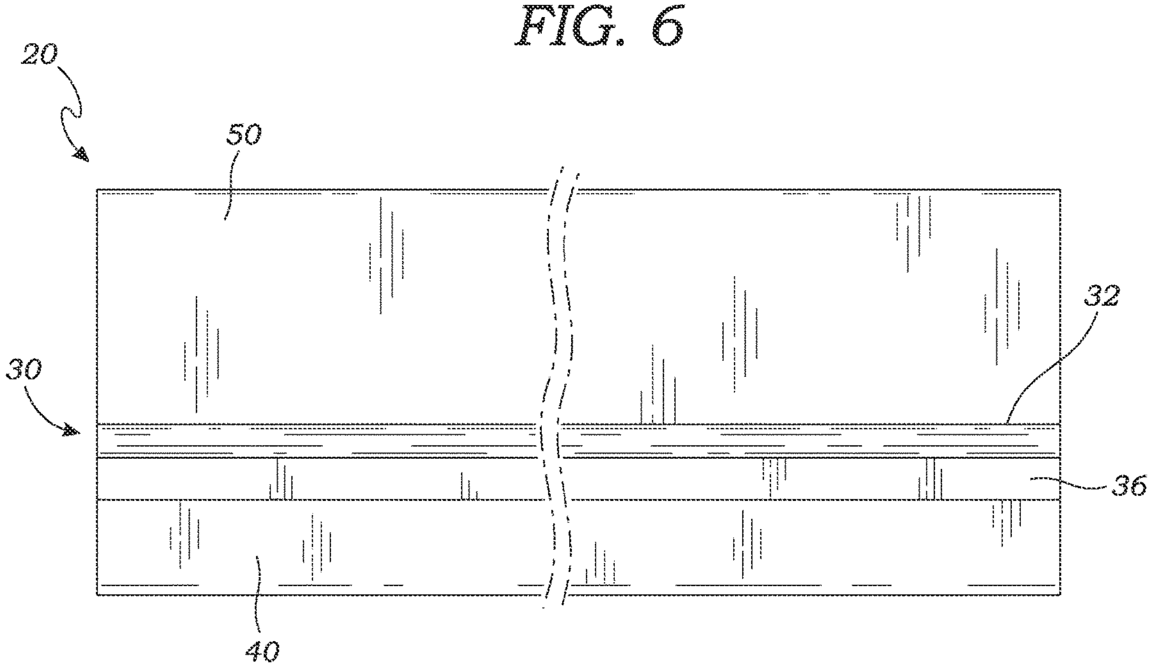
FIG. 7 is a front view thereof, in accordance with at least one embodiment.
Figure 8:
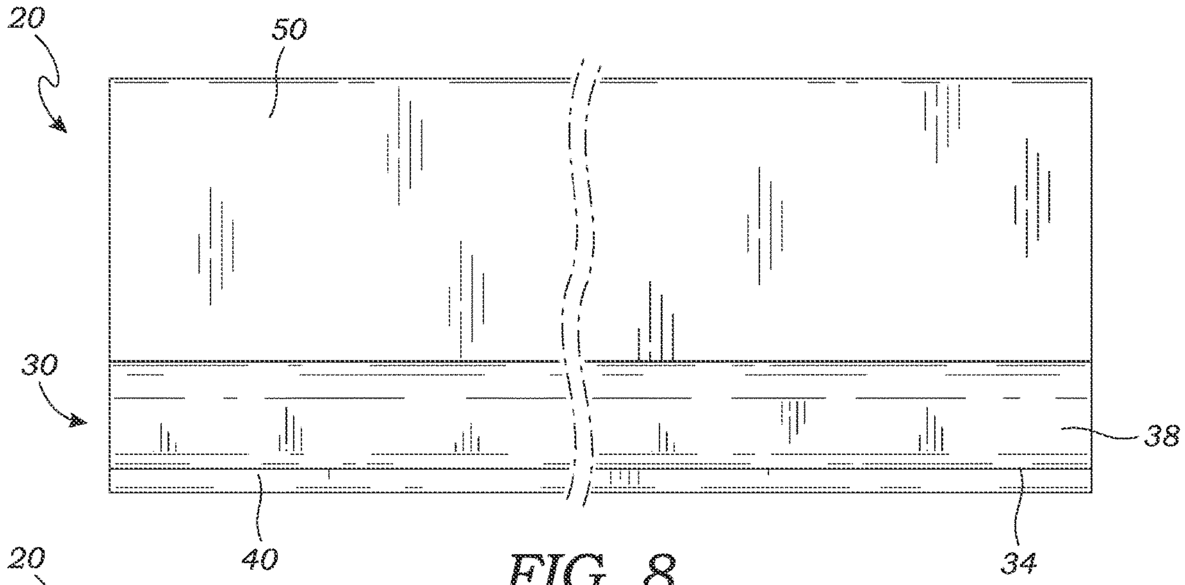
FIG. 8 is a back view thereof, in accordance with at least one embodiment.
Figure 9:
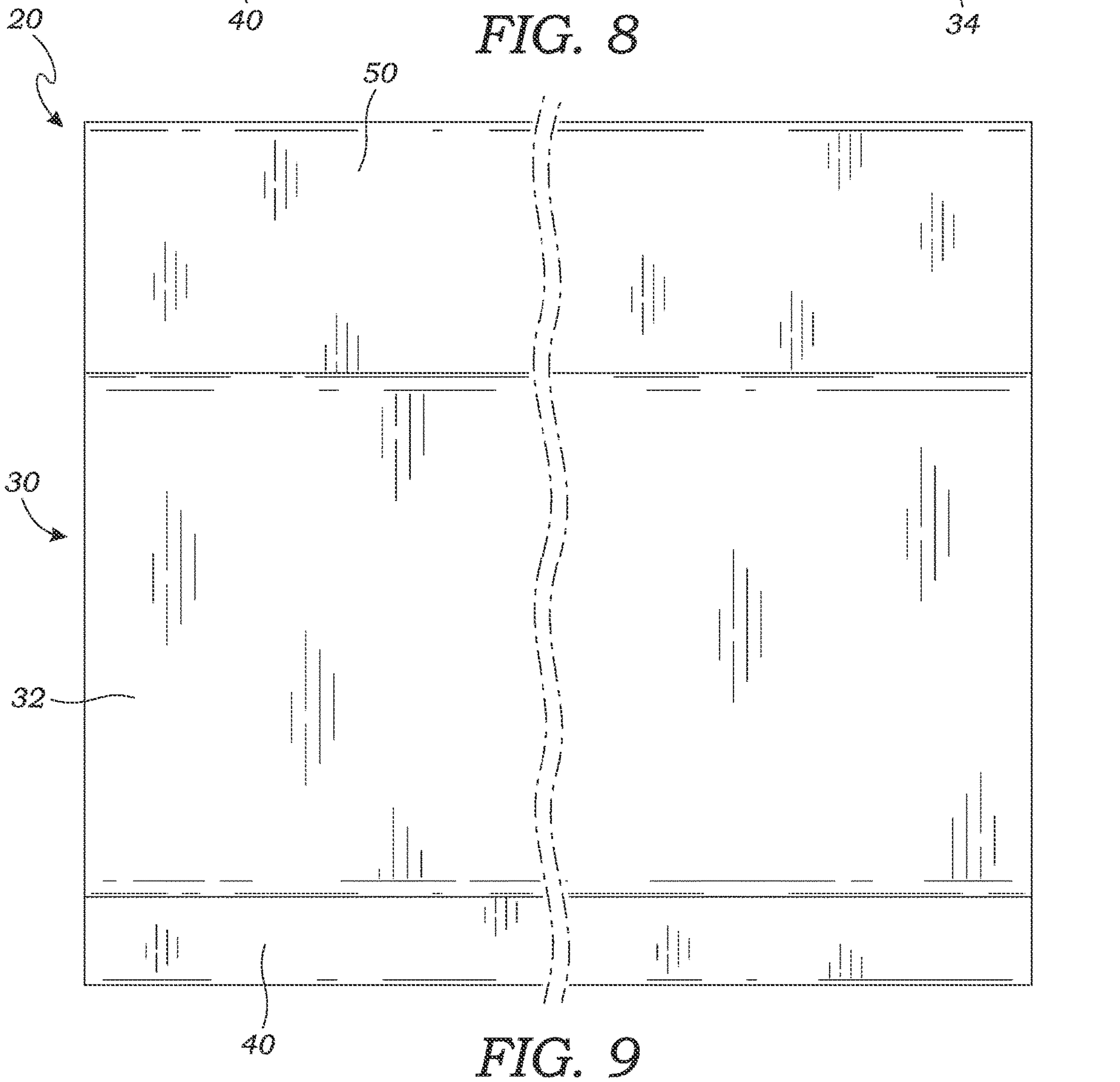
FIG. 9 is a top view thereof, in accordance with at least one embodiment.
Figure 10:
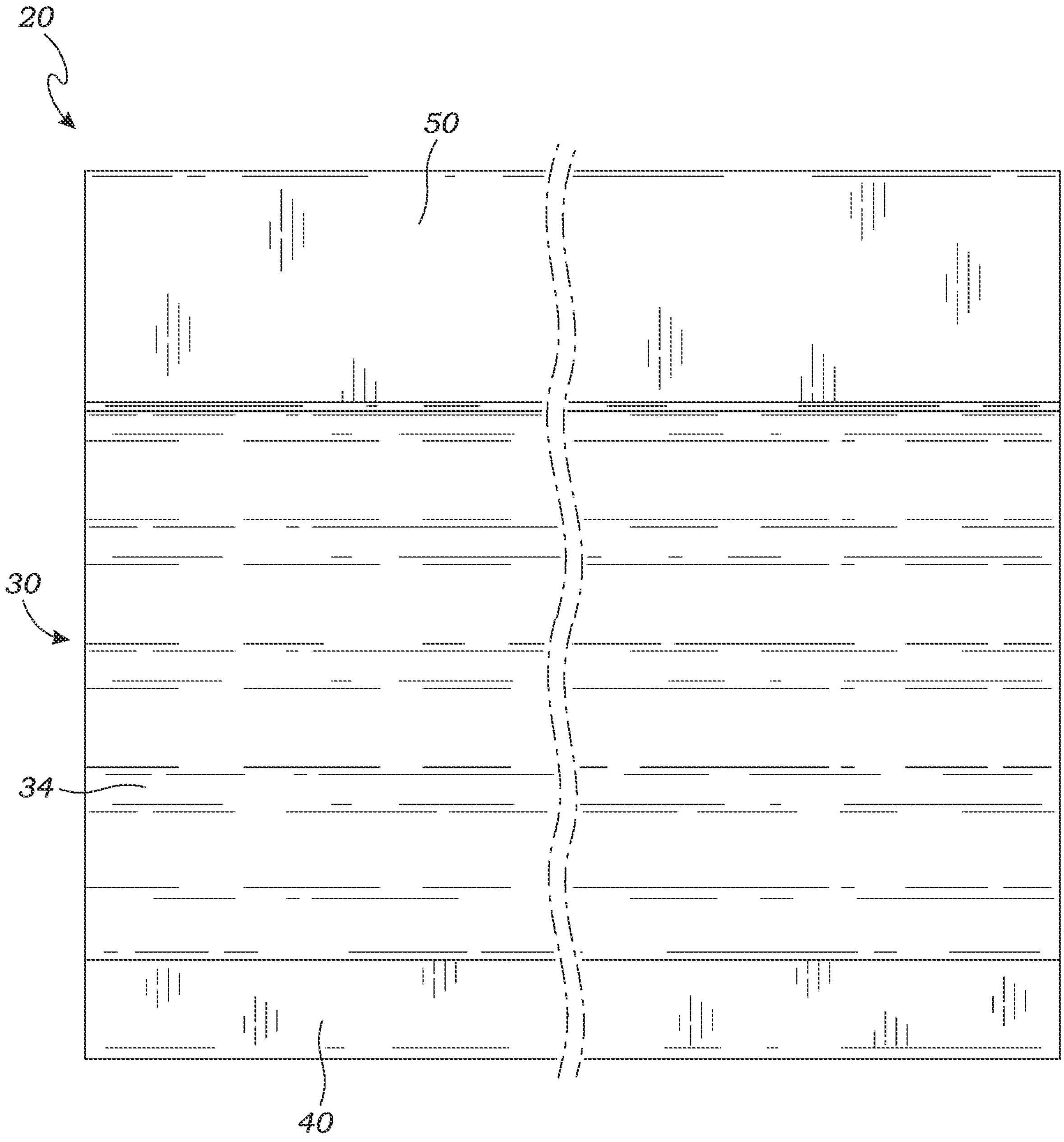
FIG. 10 is a bottom view thereof, in accordance with at least one embodiment.

Briefly, as seen in FIGS. 3-5, there are shown enlarged end views of exemplary prior art trim seals T, each again having a body B with a front surface E and a rear flexible flap F, with there essentially being a variety of configurations relating to how and from where the flap F extends from the back area of the body B. Each such prior art trim seal T is effectively dual durometer material, meaning that the body B and the flexible flap F are of two different durometers commonly extruded out of a single production line or die in a manner known and practiced in the art.

Figure 11:
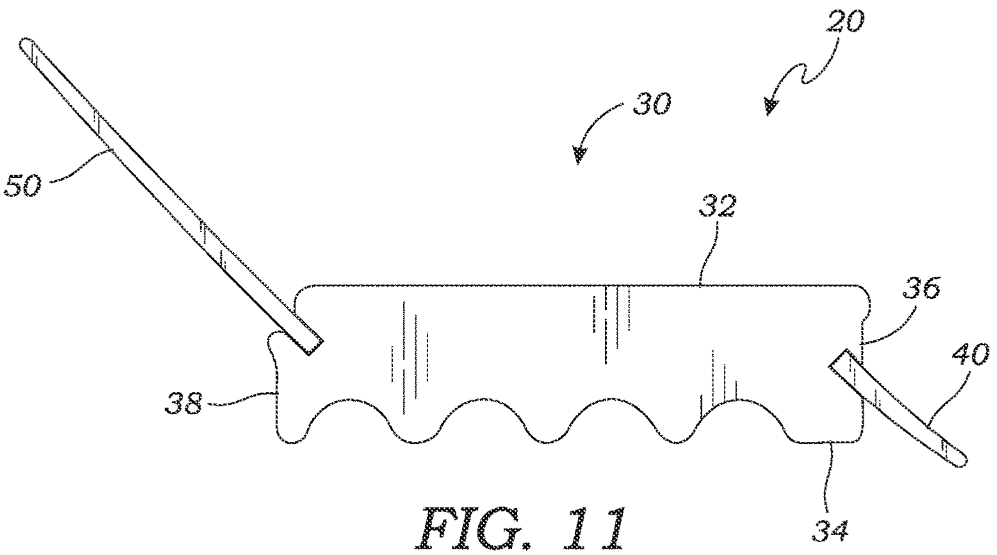
FIG. 11 is an end view thereof, in accordance with at least one embodiment.
Figure 12:
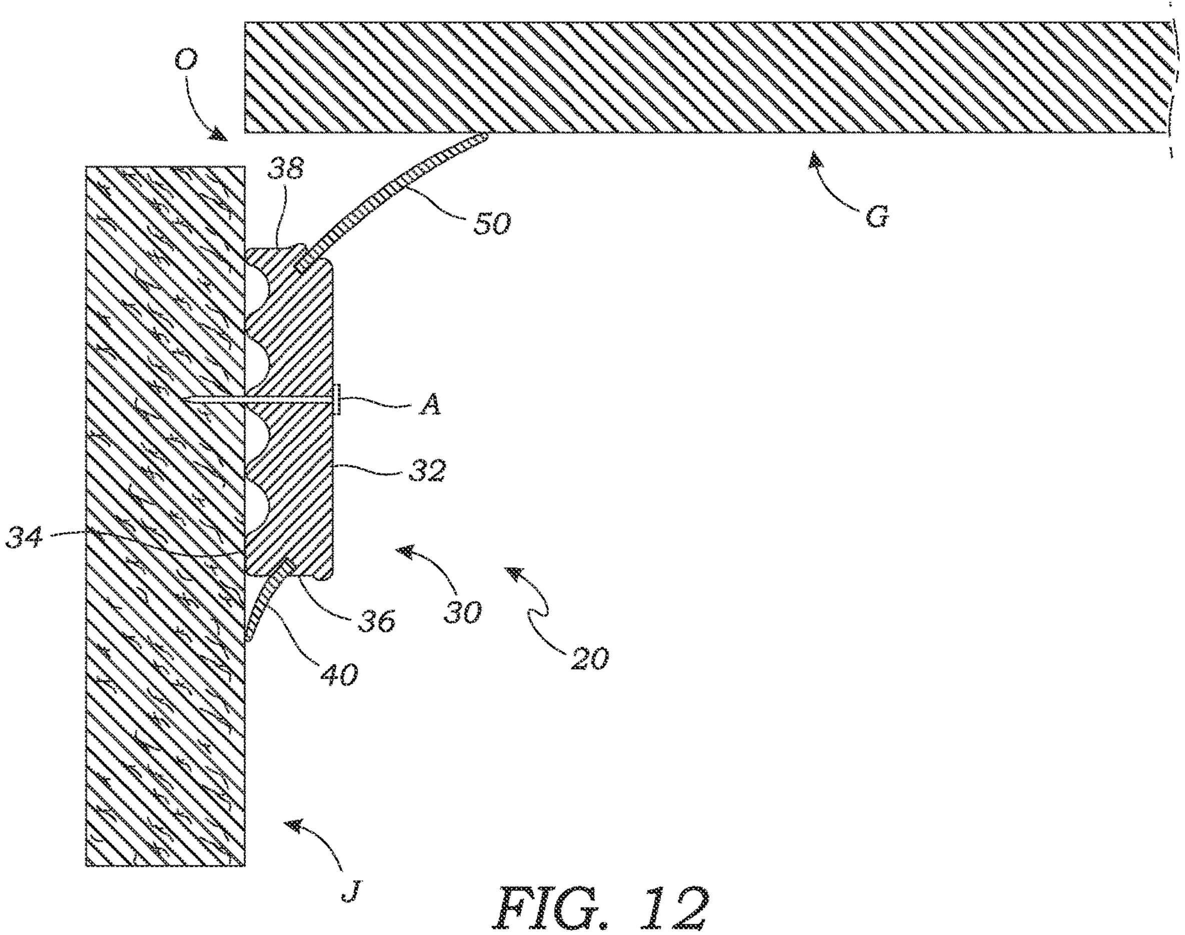
FIG. 12 is a reduced-scale end view thereof as installed on a door frame adjacent to an overhead garage door, in accordance with at least one embodiment.

Referring now to FIGS. 6-11, there are shown perspective and orthographic views of an exemplary embodiment of a trim seal apparatus 20 according to aspects of the present invention. The apparatus 20 comprises, in the exemplary embodiment, a body 30 having a face surface 32 and an opposite ribbed surface 34 and a front surface 36 and an opposite rear surface 38. Extending at an angle from or along the front surface 36 downwardly or in the direction of the ribbed surface 34 is a lengthwise front flap 40 and extending at an angle from or along the rear surface 38 upwardly or in the direction of the face surface 32 is a lengthwise rear flap 50. As shown in FIG. 12, when the trim seal apparatus 20 is installed on a door frame such as in a vertical orientation on an exemplary jamb J as through insertion of one or more fastener A through the body 30 from the outwardly oriented face surface 32 to and through the inwardly oriented ribbed surface 34 and into the adjacent jamb J, the rear flap 50 is oriented toward and configured to make sealing contact with the perimeter face of the garage door G when closed in a manner known in the art and the front flap 40 is oriented toward and configured to make sealing contact with the door frame or jamb J as shown when the trim seal apparatus 20 is installed vertically or the header H (FIGS. 1 and 2) when the trim seal apparatus 20 is installed horizontally.

Notably, the trim seal apparatus 20 according to aspects of the present invention is of unitary construction as a single extrusion, even if dual durometer vinyl or other such material is employed as is known in the art such that the front and rear flaps 40, 50 are relatively more flexible or resilient than the trim seal body 30. As such, a single trim seal apparatus 20 as shown and described may be extruded, cut to length, and installed on the frame of a garage door opening O so as to seal against both the garage door G when closed via the rear flap 50 and the garage door frame or jamb J or header H via the front flap 40, providing a relatively simple and inexpensive solution to effectively sealing the gap between the garage door G and the frame about the garage door opening O. More particularly, while the rear flap 50 is typically approximately one to one-and-a-half inches (1.0-1.5 in.) in width or extension away from the rear edge 38 of the trim seal body 30 at an angle of approximately forty-five degrees (45°), such rear flap 50 width or extension denoted W2 in FIG. 6, the front flap 40 may be approximately only one-quarter inch to one-half inch (0.25-0.5 in.) in width or extension away from the front edge 36 of the trim seal body 30 again at an angle of approximately forty-five degrees (45°), such front flap 40 width or extension denoted W1 in FIG. 6, such that the front flap 40 is significantly smaller than the rear flap 50, thereby saving material costs while still effectively sealing at the front of the trim seal body 30 at the door frame jamb J or header H. In terms of proportionality, then, the width W1 of the front flap 40 should in no case be greater than fifty percent (50%) of the width W2 of the rear flap 50 (e.g., 0.5 in./1.0 in.) and can be as low or small as approximately fifteen percent (15%) that of the rear flap 50 (e.g., 0.25 in./1.5 in.); preferably, the width W1 of the front flap 40 relative to the width W2 of the rear flap 50 is in the range of twenty-five to forty percent (25-40%). In a preferred embodiment, the front flap 40 extends from a location on the body front edge 36 that is at least midway between the face surface 32 and the ribbed surface 34 or that is closer to the ribbed surface 34 than the face surface 32, so as to again minimize the width W1 of the front flap 40 and thus the cost of the trim seal apparatus 20 as well as to achieve a desired aesthetic appearance having a relatively low-profile front flap 40 that somewhat approximates the look of a bead of caulk, of course without that added step and expense. The typical trim seal body 30 being approximately one-half inch (0.5 in.) thick and again taking the width W1 of the front flap 40 to be in the range of one-quarter inch to one-half inch (0.25-0.5 in.), it follows that the front flap 40 extends from an intermediate location along the front edge 36 of the body 30 as shown in FIGS. 11 and 12, meaning that assuming a forty-five degree angle of the front flap 40 and an installation location substantially midway along the half inch front edge 36 or a quarter inch side of a 45-45-90 right triangle, the hypotenuse or side opposite the right angle and thus the distance defining the width W1 of the front flap 40 would be the side length times the square root of two or in this example approximately one-third inch ($0.25 \text{ in.} \times \sqrt{2} = 0.35$ in.), though it will be appreciated by those skilled in the art that a variety of other geometrical configurations or sizes and shapes of both the trim seal body 30 and the front and rear flaps 40, 50 may be employed according to aspects of the present invention without departing from its spirit and scope in keeping with the above principals relating to the proportional sizing of the front flap 40. Furthermore, it of course will be appreciated with reference particularly to FIG. 11 that in the at rest configuration of the front flap 40 or with the trim seal apparatus 20 uninstalled, the width W1 and angle of the front flap 40 is such that its tip or free end extends past or below the plane of the ribbed surface 34 so as to ensure that when the trim seal apparatus 20 is installed on the door frame such as the jamb J as illustrated in FIG. 12 with the ribbed surface 34 directly against the jamb J, the front flap 40 would thus contact and flex against the jamb J thereby ensuring positive or sealing contact between the front flap 40 and the door frame jamb J or header H.

Figure 13A:
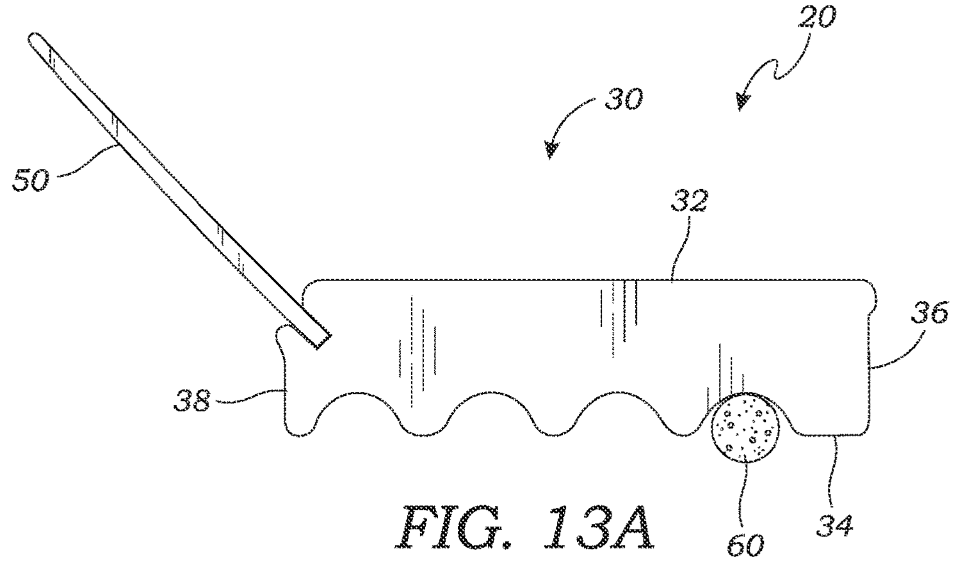
FIG. 13A is an end view of a second exemplary overhead garage door trim seal apparatus, in accordance with at least one embodiment.
Figure 14A:
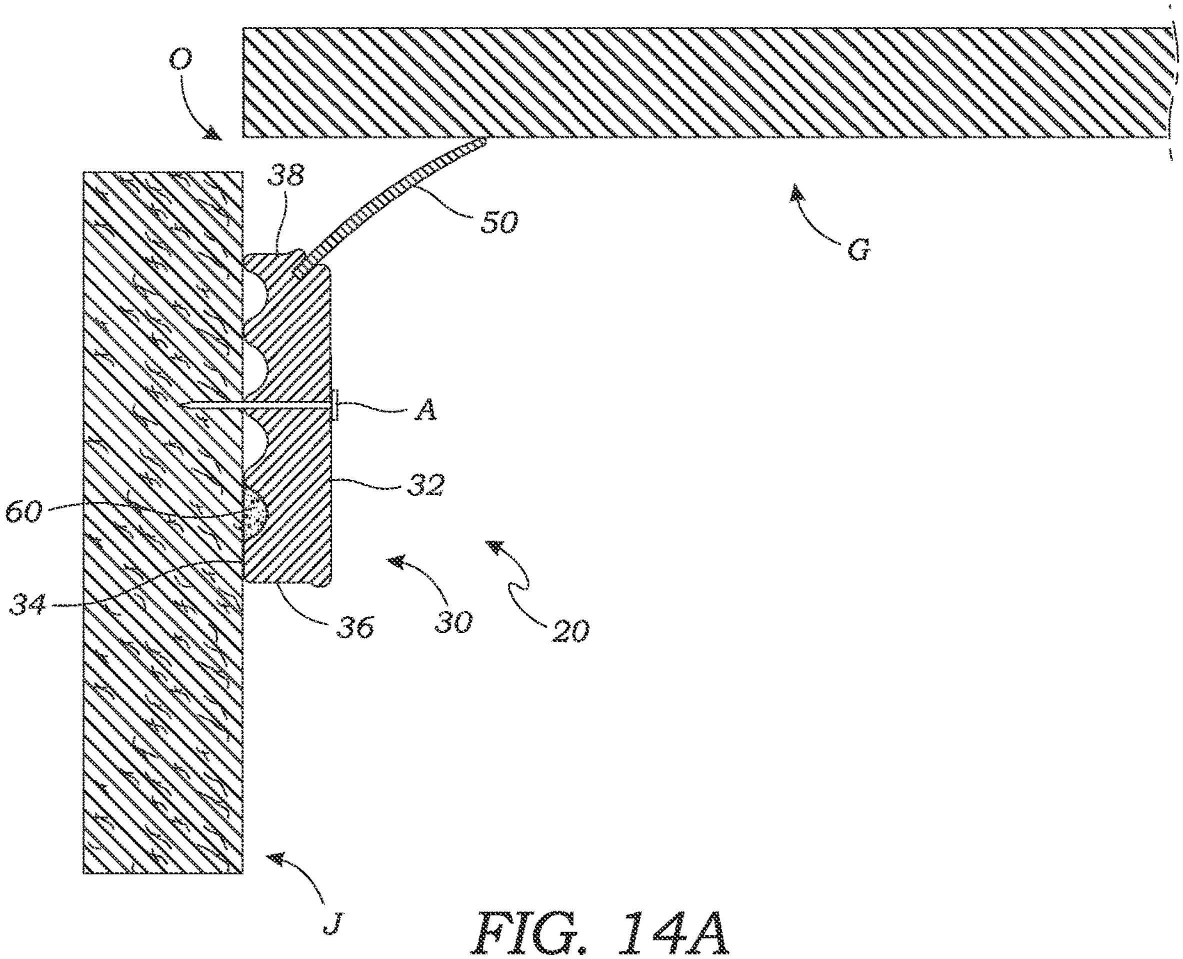
FIG. 14A is a reduced-scale end view thereof as installed on a door frame adjacent to an overhead garage door, in accordance with at least one embodiment.
Figure 13B:
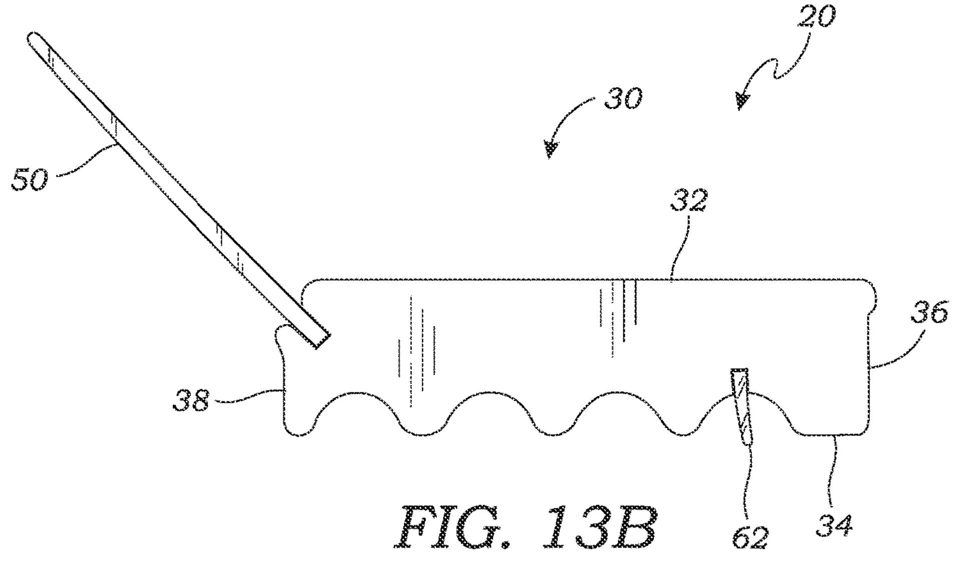
FIG. 13B is an end view of a third exemplary overhead garage door trim seal apparatus, in accordance with at least one embodiment.
Figure 14B:
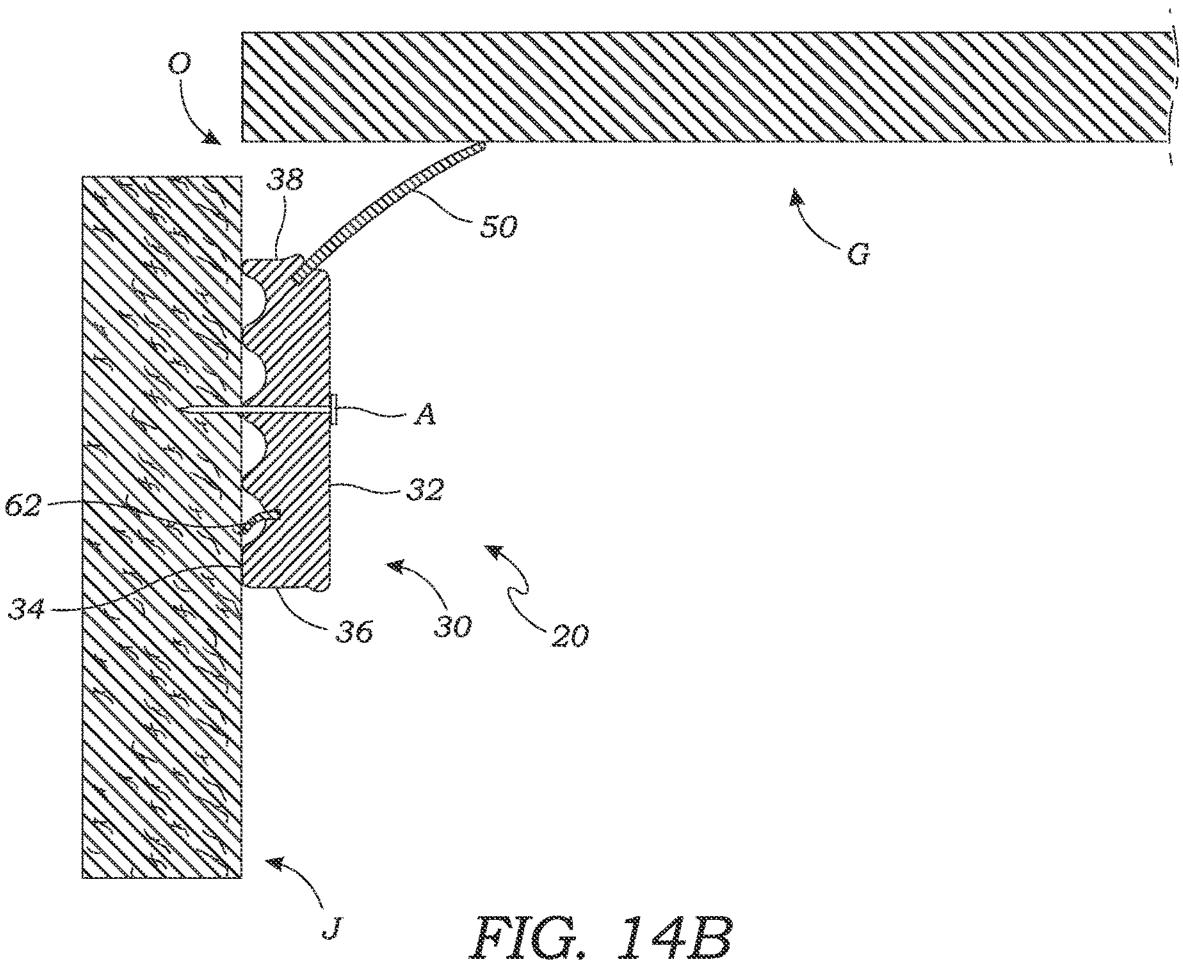
FIG. 14B is a reduced-scale end view thereof as installed on a door frame adjacent to an overhead garage door, in accordance with at least one embodiment.
Figure 13C:
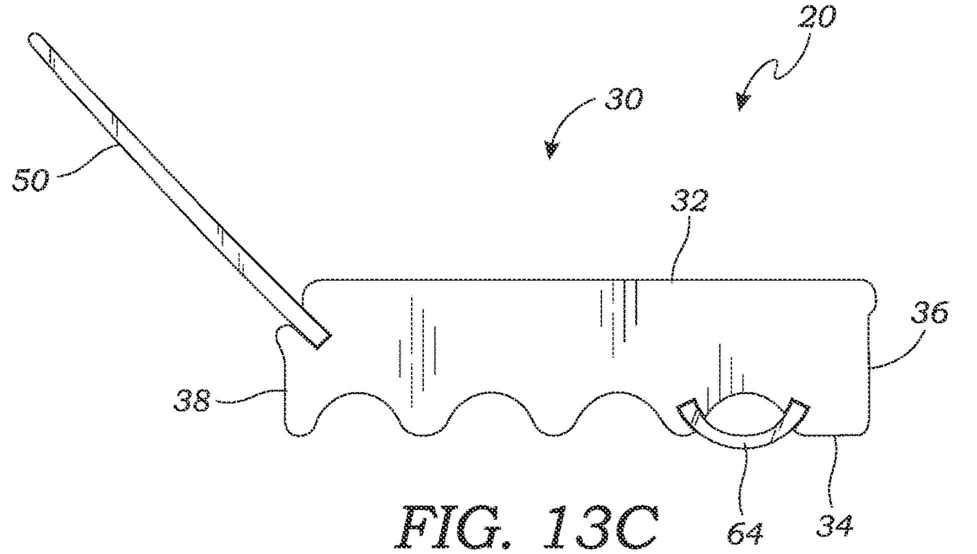
FIG. 13C is an end view of a fourth exemplary overhead garage door trim seal apparatus, in accordance with at least one embodiment.
Figure 14C:
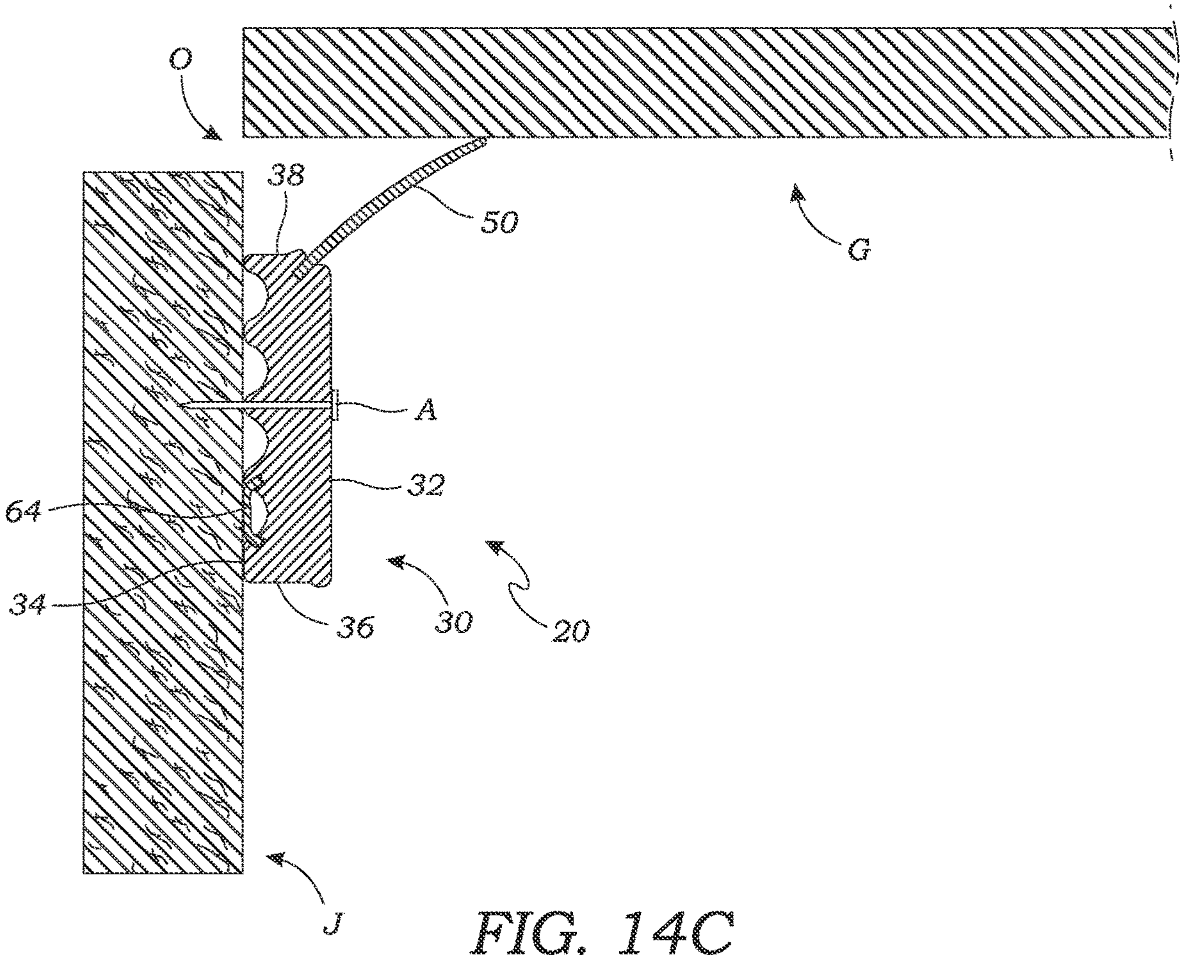
FIG. 14C is a reduced-scale end view thereof as installed on a door frame adjacent to an overhead garage door, in accordance with at least one embodiment.

Turning to FIGS. 13 and 14, there are shown three alternative exemplary trim seal apparatuses 20 according to aspects of the present invention, each involving a seal element inserted in or incorporated within or otherwise operably configured along the back or ribbed surface 34 of the trim seal body 30 so as to seal between the body 30 and the door frame jamb J or header H (FIGS. 1 and 2) rather than at or forward of the front surface 36 of the body 30 as with the front flap 40 of FIGS. 6-12. In each such alternative embodiment, the trim seal apparatus 20 again has a body 30 having a face surface 32 and an opposite ribbed surface 34 and a front surface 36 and an opposite rear surface 38, still also having a rear flap 50 extending at an angle from the rear surface 38 upwardly or in the direction of the face surface 32. But in the first alternative exemplary embodiment of FIGS. 13A and 14A, instead of a front flap 40 for sealing at the front surface 36 of the trim seal body 30 there is a lengthwise backer rod 60 positioned in and along one of the grooves of the bottom ribbed surface 34 so as to seal between the body 30 and the door frame jamb J or header H. In such first alternative exemplary embodiment, the backer rod 60 is made of a compressible foam so as to sealingly squeeze between the ribbed surface 34 and the door frame surface such as the illustrated jamb J, as best shown in FIG. 14A where the backer rod 60 with the trim seal apparatus 20 installed is squeezed and substantially fills the space within the groove of the ribbed surface 34 so as to make surface contact along the jamb J substantially the width of the groove. In the illustrated embodiment, each groove in the ribbed surface 34 may have a width of approximately one-quarter to one-half inch (0.25-0.5 in.) and the backer rod may have a nominal diameter of approximately one eighth to three eighths inch (0.125-0.375 in.), though it will be appreciated by those skilled in the art that a variety of sizes, shapes, and materials may be employed in the configuration both of the trim seal apparatus 20 and particularly its body 30 and of the backer rod 60, such that the annular configuration of the rod 60 is to be understood as illustrative and non-limiting. Referring next to FIGS. 13B and 14B, a second alternative exemplary embodiment of a trim seal apparatus 20 according to aspects of the present invention is shown as instead having a lengthwise rib flap 62 positioned in and along one of the grooves of the bottom ribbed surface 34, again, in the illustrated embodiment the last such groove, so as to in its at rest state extend away from and beyond the bottom ribbed surface 34 as best seen in FIG. 13B, preferably at at least a slight angle, and thus to flex and seal between the body 30 and the door frame jamb J or header H when the trim seal apparatus 20 is installed as seen in FIG. 14B. And similarly, as shown in FIGS. 13C and 14C, a third alternative exemplary embodiment of a trim seal apparatus 20 according to aspects of the present invention is shown as instead having a lengthwise rib loop 64 positioned in and along one of the grooves of the bottom ribbed surface 34, again, in the illustrated embodiment the last such groove, so as to arcuately span the groove and in its at rest state bow or extend away from and at its apex beyond the bottom ribbed surface 34 as best seen in FIG. 13C and thus to flex and flatten and seal between the body 30 and the door frame jamb J or header H when the trim seal apparatus 20 is installed as seen in FIG. 14C. In the two alternative exemplary embodiments of FIGS. 13B and 14B and 13C and 14C, it will be appreciated that the respective rib flap 62 and rib loop 64 features may be co-extruded with the trim seal body 30 even of different durometer materials just as the front flap 40 and the rear flap 50 in the exemplary embodiment of FIGS. 6-12, though such is not necessarily the case. It is further noted that while the backer rod 60, rib flap 62, and rib loop 64 are each shown as being installed in the last groove of the ribbed surface 34 or the groove closest to the front surface 36, such is not necessarily the case. Moreover, more than one backer rod 60, rib flap 62, and/or rib loop 64 can be employed in multiple grooves in the ribbed surface 34 for further sealing effects. It will also be appreciated that while in the exemplary embodiments of FIGS. 13 and 14 the front flap 40 is not shown, it is possible to employ the backer rod 60, rib flap 62, and/or rib loop 64 in a trim seal apparatus 20 as in FIGS. 6-12 having the front flap 40 extending at an angle from the front surface 36 downwardly or in the direction of the ribbed surface 34, such that effectively a double- or multi-seal against the door frame jamb J or header H is achieved by the combination of the front flap 40 and the backer rod 60, rib flap 62, and/or rib loop 64. Such combinations of sealing features are within the scope of the present invention and aspects of the disclosed trim seal apparatus 20.

In forming the trim seal apparatus 20 and its body 30, front and rear flaps 40, 50, and/or backer rod 60, rib flap 62, and/or rib loop 64 according to aspects of the present invention, it will be appreciated that any appropriate materials and methods of construction now known or later developed may be employed, including but not limited to vinyl in a variety of durometers and foams, any such components being fabricated or formed as through injection molding, casting, extrusion, machining, stamping, forming, or any other such technique now known or later developed. Relatedly, such components may be formed integrally such as through co-extrusion or may be formed separately and then assembled in any appropriate secondary operation employing any assembly technique now known or later developed, including but not limited to fastening, bonding, welding, over-molding or coining, press-fitting, snapping, or any other such technique now known or later developed. Those skilled in the art will fundamentally appreciate that any such materials and methods of construction are encompassed within the scope of the invention, any exemplary materials and methods in connection with any and all embodiments thus being illustrative and non-limiting.

Aspects of the present specification may also be described as the following numbered embodiments:

1. A trim seal apparatus for selectively sealing a garage door opening, the apparatus comprising: a lengthwise body having a face surface and an opposite ribbed surface each spanning between a front surface and an opposite rear surface of the body, the body configured for being installed directly onto a door frame defining the garage door opening such that the ribbed surface is to be directly against the door frame; and a lengthwise front flap extending at an angle in the direction of the ribbed surface from a location along the front surface that is at least midway between the face surface and the ribbed surface or that is closer to the ribbed surface than the face surface, in use when the body is installed on the door frame with the ribbed surface directly against the door frame the front flap is oriented toward and configured to make sealing contact against the door frame so as to seal the garage door opening between the body and the door frame.
2. The apparatus of embodiment 1, wherein the width of the front flap is between approximately one-quarter inch and one-half inch.
3. The apparatus of embodiment 1 or embodiment 2, wherein the thickness of the body between the face surface and the ribbed surface is approximately one-half inch.
4. The apparatus of any of embodiments 1-3, wherein the angle of the front flap to the front surface is approximately forty-five degrees.
5. The apparatus of any of embodiments 1-4, further comprising a lengthwise rear flap extending at an angle in the direction of the face surface from the rear surface and configured to selectively seal the garage door opening between the body and the garage door.
6. The apparatus of embodiment 5, wherein the width of the front flap is no more than fifty percent of the width of the rear flap.
7. The apparatus of embodiment 6, wherein the width of the front flap relative to the width of the rear flap is in the range of twenty-five to forty percent.
8. The apparatus of any of embodiments 5-7, wherein the width of the rear flap is approximately one to one-and-a-half inches.
9. The apparatus of any of embodiments 1-8, further comprising a backer rod configured to be positioned between the ribbed surface and the door frame when the body is installed on the door frame with the ribbed surface directly against the door frame.
10. The apparatus of embodiment 9, wherein the ribbed surface comprises grooves each having a width of approximately one-quarter to one-half inch and the backer rod has a nominal diameter of approximately one eighth to three eighths inch.
11. The apparatus of embodiment 9 or embodiment 10, wherein the backer rod is foam.
12. The apparatus of any of embodiments 1-11, further comprising a rib flap configured to extend from the ribbed surface and seal between the ribbed surface and the door frame when the body is installed on the door frame with the ribbed surface directly against the door frame.
13. The apparatus of embodiment 12, wherein the ribbed surface comprises grooves and the rib flap extends from at least one groove of the ribbed surface.
14. The apparatus of embodiment 12 or embodiment 13, wherein the body and the rib flap are a dual durometer vinyl co-extrusion.
15. The apparatus of any of embodiments 1-14, further comprising a rib loop configured to extend from the ribbed surface and seal between the ribbed surface and the door frame when the body is installed on the door frame with the ribbed surface directly against the door frame.
16. The apparatus of claim 15, wherein the ribbed surface comprises grooves and the rib loop spans at least one groove of the ribbed surface.
17. The apparatus of embodiment 15 or embodiment 16, wherein the body and the rib loop are a dual durometer vinyl co-extrusion.
18. The apparatus of any of embodiments 1-17, wherein the body and the front flap are a dual durometer vinyl co-extrusion.
19. A method of employing a trim seal apparatus as defined in any one of embodiments 1-18, the method comprising the steps of: cutting the trim seal apparatus to a desired length; and installing the cut trim seal apparatus as by positioning the body directly onto the door frame defining the garage door opening such that the ribbed surface is directly against the door frame and the front flap is in sealing contact with the door frame opposite the garage door opening so as to seal the garage door opening between the body and the door frame.
20. The method of embodiment 19, wherein the step of installing the cut trim seal apparatus comprises passing fasteners through the body into the door frame.
21. The method of embodiment 19 or embodiment 20, further comprising the step of inserting a backer rod within a groove in the ribbed surface prior to installing the cut trim seal apparatus.
22. A kit comprising multiple trim seal apparatuses as defined in any one of embodiments 1-18.
23. The kit of embodiment 22, further comprising instructional material.
24. The kit of embodiment 23, wherein the instructional material provides instructions on how to perform the method as defined in any one of embodiments 19-21.
25. Use of a trim seal apparatus as defined in any one of embodiments 1-18 to seal between the door frame and the front of the overhead garage door.
26. The use of embodiment 25, wherein the use comprises a method as defined in any one of embodiments 19-21.

In closing, regarding the exemplary embodiments of the present invention as shown and described herein, it will be appreciated that a trim seal apparatus is disclosed and configured for effectively and relatively inexpensively and easily sealing between the door frame and the front of the overhead garage door. Because the principles of the invention may be practiced in a number of configurations beyond those shown and described, it is to be understood that the invention is not in any way limited by the exemplary embodiments, but is generally able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc. —for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A trim seal apparatus for selectively sealing a garage door opening, the apparatus comprising:

a lengthwise body having a face surface and an opposite ribbed surface each spanning between a front surface and an opposite rear surface of the body, the body configured for being installed directly onto a door frame defining the garage door opening such that the ribbed surface is to be directly contacting the door frame and the face surface is oriented away from the door frame and such that the front surface is oriented forwardly away from the garage door opening and the rear surface is oriented rearwardly toward the garage door opening;

a lengthwise rear flap extending at an angle from the rear surface upwardly away from the ribbed surface and configured to selectively seal the garage door opening between the body and a garage door operably installed relative to the garage door opening; and a lengthwise flexible front flap extending at an angle downwardly away from the face surface from a location along the front surface that is at least midway between the face surface and the ribbed surface or that is closer to the ribbed surface than the face surface so as to be offset from the face surface and leave exposed a forwardly-facing portion of the front surface between the front flap and the face surface, wherein the front flap is more flexible than the body, in use when the body is installed on the door frame with the ribbed surface directly contacting the door frame the front flap is oriented toward and configured to make sealing contact against the door frame so as to seal the garage door opening between the body and the door frame.

2. The apparatus of claim 1, wherein the width of the front flap is between approximately one-quarter inch and one-half inch.

3. The apparatus of claim 2, wherein the thickness of the body between the face surface and the ribbed surface is approximately one-half inch.

4. The apparatus of claim 1, wherein the angle of the front flap to the front surface is approximately forty-five degrees.

5. The apparatus of claim 1, wherein the width of the front flap is no more than fifty percent of the width of the rear flap.

6. The apparatus of claim 5, wherein the width of the front flap is in the range of twenty-five to forty percent of the width of the rear flap.

7. The apparatus of claim 1, wherein the width of the rear flap is approximately one to one-and-a-half inches.

8. The apparatus of claim 1, further comprising a backer rod configured to be positioned between the ribbed surface and the door frame when the body is installed on the door frame with the ribbed surface directly contacting the door frame.

9. The apparatus of claim 8, wherein the ribbed surface comprises grooves each having a width of approximately one-quarter to one-half inch and the backer rod has a nominal diameter of approximately one eighth to three eighths inch.

10. The apparatus of claim 9, wherein the backer rod is foam.

11. The apparatus of claim 1, further comprising a rib flap configured to extend from the ribbed surface and seal between the ribbed surface and the door frame when the body is installed on the door frame with the ribbed surface directly contacting the door frame.

12. The apparatus of claim 11, wherein the ribbed surface comprises grooves and the rib flap extends from at least one groove of the ribbed surface.

13. The apparatus of claim 12, wherein the body and the rib flap are a dual durometer vinyl co-extrusion.

14. The apparatus of claim 1, further comprising a rib loop configured to extend from the ribbed surface and seal between the ribbed surface and the door frame when the body is installed on the door frame with the ribbed surface directly contacting the door frame.

15. The apparatus of claim 14, wherein the ribbed surface comprises grooves and the rib loop spans at least one groove of the ribbed surface.

16. The apparatus of claim 15, wherein the body and the rib loop are a dual durometer vinyl co-extrusion.

17. The apparatus of claim 1, wherein the body and the front flap are a dual durometer vinyl co-extrusion.

18. A trim seal apparatus for selectively sealing a garage door opening, the apparatus comprising:

a lengthwise body having a face surface and an opposite ribbed surface each spanning between a front surface and an opposite rear surface of the body, the body configured for being installed directly onto a door frame defining the garage door opening such that the ribbed surface is to be directly contacting the door frame, the ribbed surface comprising lengthwise grooves, and the face surface is oriented away from the door frame and such that the front surface is oriented forwardly away from the garage door opening and the rear surface is oriented rearwardly toward the garage door opening;

a lengthwise rear flap extending at an angle from the rear surface upwardly away from the ribbed surface and configured to selectively seal the garage door opening between the body and a garage door operably installed relative to the garage door opening; and a rib flap extending at an angle from a groove of the ribbed surface closest to the front surface, the rib flap configured to extend from the ribbed surface and seal between the ribbed surface of the body and the door frame when the body is installed on the door frame with the ribbed surface directly contacting the door frame, in use to seal the garage door opening between the body and the door frame.

19. A trim seal apparatus for selectively sealing a garage door opening, the apparatus comprising:

a lengthwise body having a face surface and an opposite ribbed surface each spanning between a front surface and an opposite rear surface of the body, the body configured for being installed directly onto a door frame defining the garage door opening such that the ribbed surface is to be directly contacting the door frame, the ribbed surface comprising lengthwise grooves; and a rib loop spanning at least one groove of the ribbed surface, the rib loop configured to extend from the ribbed surface and seal between the ribbed surface of the body and the door frame when the body is installed on the door frame with the ribbed surface directly contacting the door frame, in use to seal the garage door opening between the body and the door frame.

* * * * *